Figure 10:
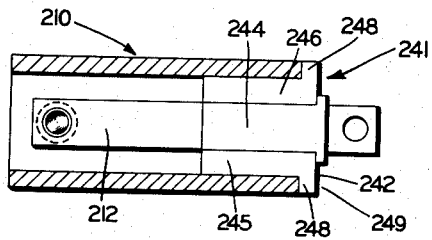

Dec. 14, 1965
G. E. WEHL
3,223,809
MOUNTING CONTACT STRIP MEANS FOR THERMOSTATIC SWITCHES
Filed Nov. 4, 1963
2 Sheets-Sheet 1
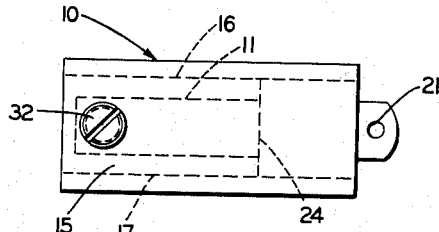
Fig. 1
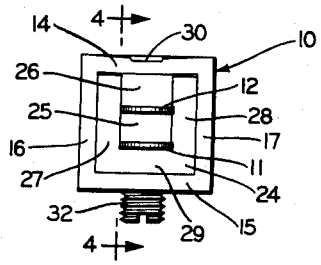
Fig. 2
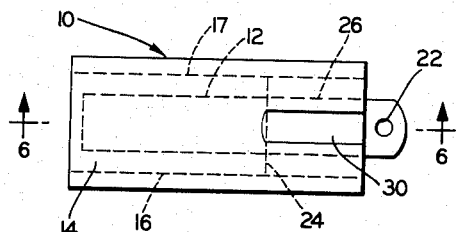
Fig. 3
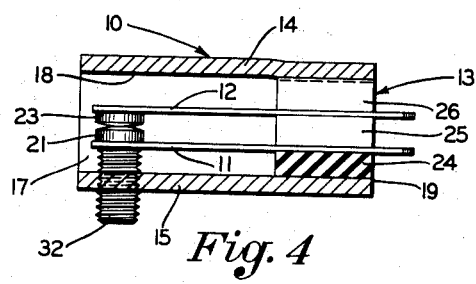
Fig. 4
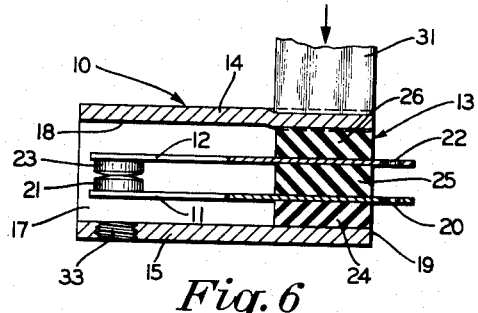
Fig. 6
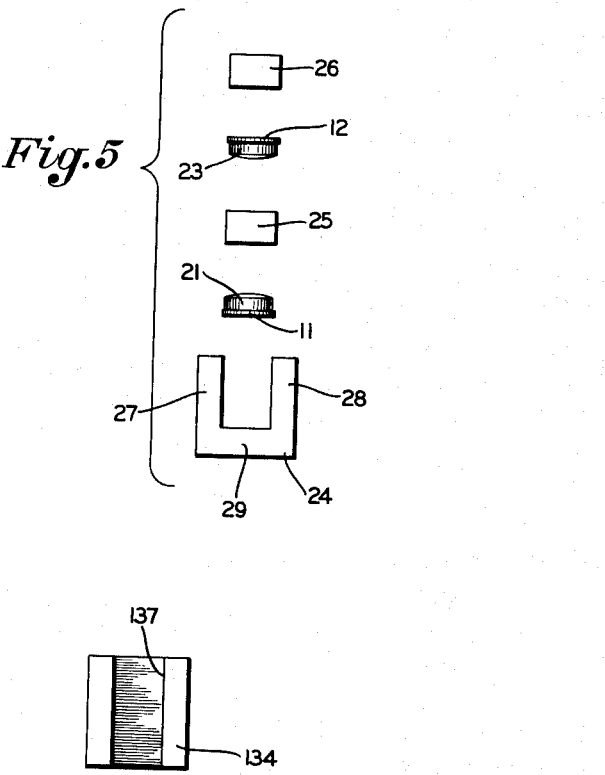
Fig. 5
Fig. 8
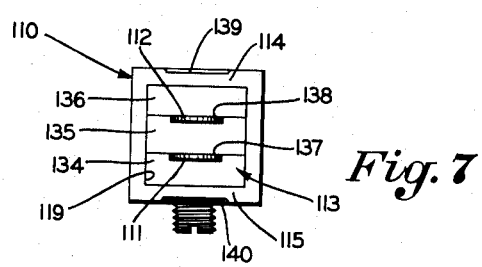
Fig. 7
INVENTOR.
Glenn E. Wehl
BY
Frease, Bishop, Johns & Schick
ATTORNEYS INVENTOR.
Glenn E. Wehl
BY
Frease, Bishop, Johns & Schick
ATTORNEYS United States Patent Office
3,223,809
Patented Dec. 14, 1965

3,223,809
MOUNTING CONTACT STRIP MEANS FOR THERMOSTATIC SWITCHES
Glenn E. Wehl, North Canton, Ohio, assignor to Portage Electric Products, Inc., North Canton, Ohio, a corporation of Ohio
Filed Nov. 4, 1963, Ser. No. 321,703
4 Claims. (Cl. 200—138)

This application is a continuation-in-part of my co-pending application, Serial No. 207,924, filed July 6, 1962, and now abandoned.

My invention relates to improvements in thermostat switch construction, and more specifically to a thermostat switch of the type having aligned contacts mounted therein, each suspended on a flexible metal strip member and with one or both of the flexible strip members being formed of the usual bi-metal for relative movement between the contacts subject to temperature variations. Even more specifically, my invention relates to thermostat switches of the foregoing type and the particular means for suspending the contact flexible strip members therein.

Many prior forms of thermostat switch constructions have been provided, many of which have included aligned contacts mounted therein on flexible strips and at least one of these flexible strips being formed of the usual bi-metals for movement subject to temperature variations. With such constructions, it is possible to provide relatively accurate electrical control of the many sundry types of household appliances found in the modern home, such as, for instance, the usual coffeemakers.

One of the major difficulties with the prior thermostat constructions used for these purposes is that it is necessary to use materials which are relatively expensive in the electrical circuit portions of the switches, and these costs have been added to, in most cases, by forming the constructions so that relatively expensive insulating means are also needed, thereby resulting in a relatively high overall cost. Many attempts have been made to reduce this additional expense required for providing the proper insulation of the electrical circuit portions of the switches and in certain cases, this has resulted in switch constructions which are operable only for relatively short periods of time, making it necessary that these switches be frequently replaced.

Furthermore, in any thermostat switch construction and particularly the type having aligned contacts each mounted on flexible metal strip members, it is an additional problem as to just how to properly suspend these flexible strip members within the switch construction and still maintain the contacts in the exact proper relationship, one to the other, over a long period of repeated use of the switch construction. Again, many attempts have been made to provide the proper support for these strip members, most of which have been too expensive for appliances made under the modern mass production facilities and presented to the market at a modest consumer cost. On the other hand, where the cost of provision has been sufficiently reduced, the resulting switch constructions are usually of relatively short useful life requiring frequent replacement.

It is, therefore, a general object of the present invention to provide a thermostat switch construction of the type having aligned contacts therein, each maintained properly positioned on flexible, preferably metal, strip members in which the useful life of the switches is relatively long and satisfactory, yet the cost of providing such switches is at a minimum.

It is a primary object of the present invention to provide a thermostat switch construction of the foregoing type in which the contact supporting flexible strip members are properly suspended therein by unique, relatively inexpensive, rigid block assemblies.

It is a further object of the present invention to provide thermostat switch construction of the foregoing type in which the electrical circuit through the aligned contacts thereof is maintained properly insulated over a long useful life, yet at a minimum of cost.

It is still a further object of the present invention to provide a thermostat switch construction of the foregoing type in which the rigid block assembly suspending the contact flexible strip members is provided with the various parts thereof formed in a unique manner, such that it is virtually impossible to form an incorrect assembly of the overall switch construction if the various parts are properly formed, thereby inherently adapting the switch construction to mass production assembly and reducing the unit cost thereof.

Finally, it is an object of the present invention to provide a thermostat switch construction of the foregoing type which satisfies all of the above objects in a relatively simple and efficient manner.

These and other objects are accomplished by the parts, constructions, arrangements, combinations and subcombinations comprising the present invention, preferred embodiments of which—illustrative of the best modes in which applicant has contemplated applying the principles—are set forth in the following description and illustrated in the accompanying drawings, and which are particularly and distinctly pointed out and set forth in the appended claims forming a part hereof.

In general terms, the thermostat switch construction comprising the present invention may be stated as including, a longitudinally extending tubular case with first and second longitudinally extending contact arms suspended therein, each of which is provided with an electrical contact thereon. The case is preferably formed with metal walls and the first and second contact arms are preferably formed of flexible metal, with at least one of these contact arms being formed of the usual bi-metal, movable subject to temperature variations.

Further, the first and second contact arms are positioned extending longitudinally into the case from an end of the case and with the contact means thereon aligned by an assembly of rigid, preferably insulating material block means. The assembly of the block means is formed in a unique manner with the first and second contact arms extending longitudinally therethrough and with the block means assembly laterally confining these contact arms, as well as underlying and properly spacing the second contact arm upwardly from the first contact arm.

In all forms of the present invention, the rigid insulating block means assembly is positioned within the one end of the metal case with the metal case being depressed or deformed downwardly for downwardly clamping a particular part of the block assembly, to thereby retain the block assembly in the case end with the first and second contact arms laterally confined by the block assembly, and extending longitudinally into the case in the desired proper position. Furthermore, in all forms of the present invention, the block assembly includes a generally U-shaped upwardly opening first rigid block means having laterally spaced leg portions and a connecting portion, with a part of the first contact arm extending longitudinally therethrough overlying the connecting portion and laterally confined by the leg portions, a second rigid insulating block means positioned therein overlying the first contact arm part and laterally confined by the leg portions, the second contact arm extending longitudinally therethrough overlying the second block means and laterally confined by the leg portions, and with the case being downwardly deformed against the insulating block means and contact arm assembly laterally between the leg portions so as to clamp the first and second contact arms and the second block means against the first block means connecting portion and laterally between the first block means leg portions.

In one form of the present invention, a third rigid insulating material block means may be positioned within the first block means overlying the part of the upper or second contact arm with this third block means being substantially totally downwardly within and laterally confined by the leg portions of the first block means, and with the case clamping downwardly against this third block means. Also, in one form of the present invention, the first generally U-shaped block means may have flange means formed at the outer end thereof, preferably extending laterally, for engagement with the end surface of the case, thereby limiting longitudinal inward movement of this first block means into the case end.

Still further, in certain forms of the present invention, the second block means, or where provided, the second and third block means, may have laterally extending flange means at the outer ends thereof engageable with the outer end surface of the first block means for limiting the longitudinal inward movement of this second and third block means into the first block means and laterally between the first block means leg portions. In still other forms of the present invention, the first and second contact arm parts may have laterally opening generally U-shaped cutouts for being received downwardly into the first block means, with parts of the first block means leg portions positioned extending laterally into the contact arm cutouts, and the second block means may be laterally flanged at both the inner and outer end to form similar laterally opening generally U-shaped cutouts which may be similarly received within the first block means, thereby securing the contact arms as well as the second block means against both inward and outward longitudinal movement relative to the first block means.

Finally, at least one of the contact arms is provided with bi-metal means thereon, either forming the entire contact arm or mounted thereon, for moving said one of the contact arms subject to temperature variations towards and away from the other contact arm. In this manner, the varying temperature acting on this bi-metal contact arm will make and break an electrical circuit through the contact arm contact means.

By way of example, embodiments of the thermostat switch construction of the present invention are illustrated in the accompanying drawings forming a part hereof, wherein like numerals indicate similar parts through the several views, and in which:

FIG. 1 is a bottom plan view of one form of the thermostat switch construction embodying certain of the principles of the present invention;

FIG. 2, an end view of the thermostat switch construction of FIG. 1;

FIG. 3, a top plan view of the thermostat switch construction of FIG. 1;

FIG. 4, a sectional view, part in elevation, looking in the direction of the arrows 4—4 in FIG. 2;

FIG. 5, an exploded end view of the rigid block means and contact arm assembly;

FIG. 6, a view similar to FIG. 4, looking in the direction of the arrows 6—6 in FIG. 3, illustrating an intermediate assembly operation for installing the rigid block means and contact arm assembly of FIG. 5 in the case of the thermostat switch construction of FIG. 1;

FIG. 7, an end view of a modified form of a thermostat switch construction embodying certain of the principles of the present invention;

FIG. 8, a top plan view of one of the rigid block means of the thermostat switch construction of FIG. 7.

Figure 9:
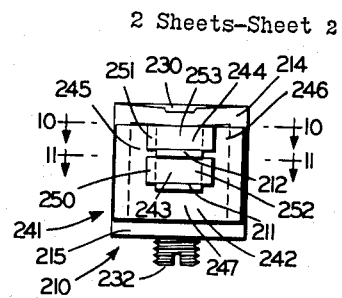
Figure 11:
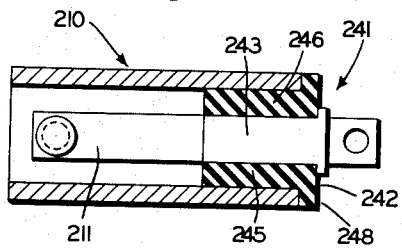
Figure 12:
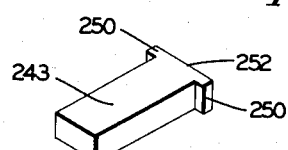
Figure 13:
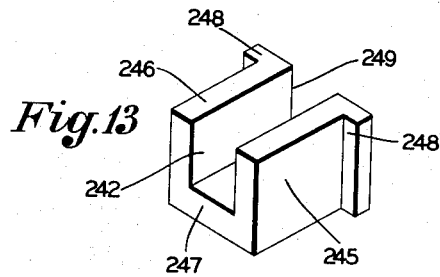
Figure 15:
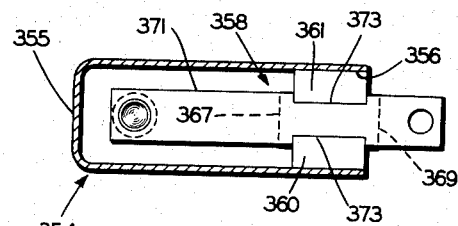
Figure 14:
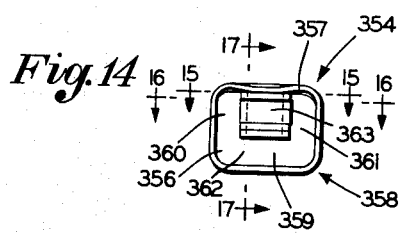
Figure 16:
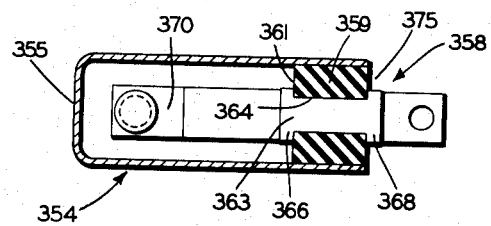
Figure 18:
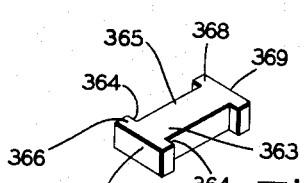
Figure 17:
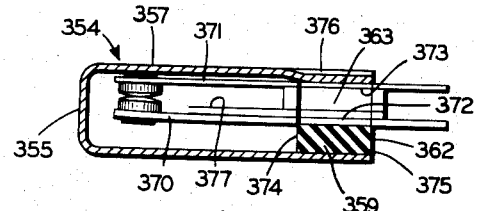

FIG. 9, an end view of another modified form of a thermostat switch construction embodying certain of the principles of the present invention;

FIG. 10, a sectional view, part in elevation, looking in the direction of the arrows 10–10 in FIG. 9;

FIG. 11, a sectional view, part in elevation, looking in the direction of the arrows 11—11 in FIG. 9;

FIG. 12, a top-side perspective view of one of the rigid block means of the thermostat switch construction of FIG. 9;

FIG. 13, a top-side perspective view of another of the rigid block means of the thermostat switch construction of FIG. 9;

FIG. 14, an end view of still another modified form of a thermostat switch construction embodying certain of the principles of the present invention;

FIG. 15, a sectional view, part in elevation, looking in the direction of the arrows 15–15 in FIG. 14;

FIG. 16, a sectional view, part in elevation, looking in the direction of the arrows 16—16 in FIG. 14;

FIG. 17, a sectional view, part in elevation, looking in the direction of the arrows 17—17 in FIG. 14; and FIG. 18 a top-side perspective view of one of the rigid block means of the thermostat switch construction of FIG. 14.

Referring to FIGS. 1 through 6, the first embodiment of the thermostat switch construction of the present invention includes a generally longitudinally extending, preferably metal, tubular case, generally indicated at 10, a first preferably flexible metal and strip-like contact arm 11, a second preferably flexible metal and strip-like contact arm 12, and a rigid preferably insulating block assembly, generally indicated at 13. The case 10 may be formed of metal such as aluminum, brass or steel, and as shown, is formed with the flat top wall 14, bottom wall 15, and side walls 16 and 17, thereby forming the case with a longitudinally extending generally square or rectangular cross-section opening 18 and at least one open end 19.

The first or lower contact arm 11, as viewed in FIGS. 2, 4, 5 and 6, is positioned suspended by the block assembly 13 extending into the case opening 18 from said block assembly, and also preferably extending longitudinally through the block assembly outward of the case open end 19. For purposes of the particular form shown, this first contact arm 11 is provided outward of the block assembly 13 and case open end 19 with an electrical connector 20.

At the inner end of this first contact arm 11 within the case opening 18, an upwardly extending first contact means 21 is formed thereon, preferably in electrical contact therewith, and this first contact means may be formed of the usual materials, such as a silver alloy. Still further, the first contact arm 11 is preferably merely formed of a usual electrically conducting flexible metal, such as spring brass.

The second contact arm 12 is maintained positioned suspended by the block assembly 13 spaced above the first contact arm 11 and in shape, size and extension is substantially the same as the first contact arm, having the electrical connector 22 outward of the block assembly 13 and the case open end 19, and also having the second contact means 23 mounted on the inner end thereof within the case opening 18 aligned for abutment with the first contact means 21. This second contact means 23 is also formed of usual material, such as a silver alloy, for providing an electrical circuit through the first and second contact means 21 and 23 when these contact means are abutting or in electrical contact.

Furthermore, with the first contact arm 11 formed of a usual flexible electrically conducting material, it is necessary to form the second contact arm 12 having bimetal means thereon, that is, either by forming the second contact arm totally of proper bi-metal material, or by forming this second contact arm of a composite metal strip including bi-metal means, and in either case, preferably electrically conducting. It is important for purposes of the present invention, that both the first and second contact arms 11 and 12 will have lateral widths less than the lateral width of the case opening 18.

The block assembly 13 is formed of a generally U-shaped upwardly open first block 24, a generally rectangular second block 25 and a generally rectangular third block 26, each of which is preferably formed of a usual electrically insulating material which is rigid in finished form preferably porcelain. Further, in view of the particular upward open U-shape thereof, the first block 24 includes the laterally spaced upstanding leg portions 27 and 28, laterally separated by the lower connecting portion 29.

As shown in FIGS. 2, 4, 5 and 6, these three blocks 24, 25 and 26 are assembled with a part of the first contact arm 11 on the first block connecting portion 29, dimensioned for lying totally downwardly within and closely laterally between the first block leg portions 27 and 28; the second block 25 overlying the part of the first contact arm 11, dimensioned for lying totally downwardly within and closely laterally between the first block leg portions 27 and 28; a part of the second contact arm 12 overlying the second block dimensioned for lying totally downwardly within and closely laterally between the first block block leg portions 27 and 28; and the third block 26 overlying the part of the second contact arm 12, dimensioned for lying closely laterally between the first block leg portions 27 and 28. Thus, the second block 25 and the parts of the first and second contact arms 11 and 12 are totally downwardly and laterally enclosed by the first block 24, and the third block 26 is likewise substantially totally enclosed protruding upwardly above the first block 24 only slightly for convenience in clamping, as shown in FIG. 2. Furthermore, the first and second contact arms 11 and 12, and the first, second and thrid blocks 24, 25 and 26 can be assembled in this manner remote from the case open end 19 into the case opening 18 and into proper final assembled position, as shown in FIG. 6.

Thereafter, it is merely necessary to form preferably a single depression 30, by usual die meanss 31, in the case top wall 14 overlying the third block 26 laterally between the first block leg portions 27 and 28. This forces the case top wall 14 to deform downwardly against the third block 26 downwardly clamping the second and third blocks 25 and 26 and the parts of the first and second contact arms 11 and 12 within the upward opening of the first block 24 against the first block lower connecting portion 29 laterally between the first block leg portions 27 and 28 and, due to the rigidity of these three blocks 24, 25 and 26, this will maintain these three blocks properly assembled in the case open end 19 with the first contact arm 11 tightly gripped between the first and second blocks 24 and 25, and the second contact arm 12 tightly gripped between the second and third blocks 25 and 26.

Thus, the parts of the first and second contact arms 11 and 12 gripped by the three blocks 24, 25 and 26 are not only laterally confined, spaced from the case side walls 16 and 17, but also these contact arms 11 and 12 extend longitudinally through the block assembly 13 and are maintained against longitudinal movement relative to this block assembly.

For calibration purposes, an adjustment screw 32 may be positioned extending through a threaded opening 33 in the case bottom wall 15 and bearing against the inner end of the first contact arm 11 for adjustably maintaining a permanent desired position of the first contact arm relative to the second contact arm 12, so that the first and second contact means 21 and 23 will make or break an electrical circuit therethrough at the proper desired temperature. This particular predetermined temperature is also, of course, partially determined, as is usual in thermostat switches, by the particular composition of the bi-metal second contact arm 12 and the extension of these contact arms 11 and 12 from the block assembly 13. In the case where the first contact arm 11 is formed of an electrically conducting material, it is preferred to form the adjustment screw 32 of a non-electrically conducting material, such as totally of nylon or of metal with a porcelain insert.

It is, of course, possible and in certain cases desirable, to eliminate any use of the adjustment screw 32. In this case it is preferable to either precalculate the various parts for proper calibration merely simultaneously with the assembly operation, or to obtain proper calibration by bending one or both of the first and second contact arms 11 and 12 after final assembly.

In any event, in final assembly an electrical circuit may be connected to the electrical connector 20 on the first contact arm 11 and the electrical connector 22 on the second contact arm 12, thereby providing an electrical circuit through the first contact arm and first contact means 21 to the second contact means 23, and through the second contact arm 12 when the contact means are together making an electrical circuit therethrough. Furthermore, this electrical circuit will be insulated completely from the case 10 by the insulating block assembly 13 completely surrounding the parts of the first and second contact arms 11 and 12.

A somewhat modified form of the thermostat switch construction of the present invention is shown in FIGS. 7 and 8, and the only differences between this modified form and the first form described in the foregoing, are the formation of the insulating block assembly and the manner in which this insulating block assembly and the contact arms are secured within the case open end. Otherwise, the construction is substantially the same.

As shown, in this second form, first, second and third rigid blocks 134, 135 and 136 are provided, each preferably being formed of insulating material. Each of the first and second blocks 134 and 135 are formed at the top surfaces thereof with the longitudinally extending cutouts 137 and 138, respectively, as illustrated in FIG. 8, with the size of these cutouts being precalculated to receive, laterally confine, and longitudinally grip the parts of the first and second contact arms 111 and 112.

The third block 136 is preferably merely a plain rectangular block, and all three of these blocks extend laterally substantially the entire distance of the case open end 119. Thus, in assembly, as shown in FIG. 7, the first contact arm 111 is received in the cutout 137 of the first block 134, the second block 135 is positioned over both the first block 134 and first contact arm 111, the second contact arm 112 is positioned in the second block cutout 138, and the third block 136 is positioned over both the second contact arm 112 and the second block 135.

It is important in this modified form, that the depths of the first and second block cutouts 137 and 138 will be slightly less than the vertical thickness of the contact arms 11 and 12, so that when these contact arms and three blocks 134, 135 and 136 are assembled as described, the contact arms will not only be laterally confined, but will also be gripped against longitudinal movement relative to the blocks. In this modified form, as in the first form described above, the three blocks and two contact arms may be pre-assembled remote from the case 110, and then inserted as a unit into the case open end 119.

The final assembly step of this modified form is the formation of the depression 139 in the case top wall 114, and also preferably the depression 140 in the case bottom wall 115, which clamps the case top and bottom walls against the first and third blocks 134 and 136, thereby securely clamping the case 110 against the block assembly 113 and maintaining the three blocks 134, 135 and 136 properly assembled with the contact arms 111 and 112.

Still another modified form of the thermostat switch construction of the present invention is shown in FIGS. 9 through 13, and again the major difference between this third form and the first form shown in FIGS. 1 through 6 and previously described in the foregoing, is the formation of the insulating block assembly. As shown in FIGS. 9 through 13, this third form again includes the metal case 210, the similar flexible metal first and second contact arms 211 and 212 with a modified form of insulating block assembly, generally indicated at 241.

The insulating block assembly 241, similar to the first form, includes a main generally U-shaped upwardly open first block 242, a generally rectangular second block 243, and a generally rectangular third block 244, each of which is preferably again formed of the usual electrically insulating material, rigid in finished form, preferably procelain. Thus, the generally U-shaped first block 242 has the laterally spaced upstanding leg portions 245 and 246 laterally separated by the lower connecting portion 247.

The principal difference between the first, second and third blocks 242, 243 and 244 and the first form described, is that the first block 242 is formed with flanges 248 preferably extending laterally from an outer end 249, whereby these flanges 248 will longitudinally engage the end of the case 210. Furthermore, the second and third blocks 243 and 244 are formed with laterally extending flanges 250 and 251 at the outer ends 252 and 253 thereof, so that these lateral flanges 250 and 251 will longitudinally engage the outer end 249 of the U-shaped first block 242.

The second and third blocks 243 and 244 are substantially identical and the showing in FIG. 12 of the second block 243 removed from the insulating block assembly 241 will suffice to clearly show the form of both of these blocks. The generally U-shaped first block 242 is clearly shown in FIG. 13 removed from the insulating block assembly 241.

Thus, with this third form of the thermostat switch construction of the present invention shown in FIGS. 9 through 13, the first and second contact arms 211 and 212 may be assembled with the first, second and third blocks 242, 243 and 244 of the insulating block assembly 241 outward of the case 210 and inserted en masse into case 210 as a complete assembly. The lateral flanges 250 and 251 on the second and third blocks 243 and 244 will longitudinally limit the positioning of these two blocks relative to the U-shaped first block 242 and thereby exactly establish the proper positioning of the various blocks. Furthermore, the flanges 248 on the U-shaped first block 242 will limit and establish proper positioning of the entire assembly, including the first and second contact arms 211 and 212 and the entire insulating block assembly 241, as to longitudinal insertion into the end of the case 210.

After the insulating block assembly 241 and the first and second contact arms 211 and 212 have been thusly longitudinally positioned within the case 210, final assembly is accomplished merely by forming the single depression 230 in the case top wall 214 as in the first form previously described, thereby downwardly clamping the case top wall 214 against the third block 244 between the leg portions 245 and 246 of the U-shaped first block 242. This downwardly clamps the parts of the first and second contact arms 211 and 212, as well as the second and third blocks 243 and 244, substantially totally downwardly within the U-shaped first block leg portions 245 and 246 and against the U-shaped first block connecting portion 247, and this also clamps the U-shaped first block 242 securely within the end of the case 210.

As in other forms of the thermostat switch construction of the present invention previously described, either or both of the first and second contact arms 211 and 212 may be provided with the usual bi-metal means thereon for moving these contact arms toward and away from each other subject to temperature variations in the usual manner. Also as in the first form, an adjustment screw 232, preferably of a non-electrically conducting material, may be threadably mounted through the case bottom wall 215 underlying the first contact arm 211 for providing selective adjustment of this contact arm.

A still further modified form of the thermostat switch construction of the present invention is shown in FIGS. 14 through 18 and this form is somewhat of a cross between the first form shown in FIGS. 1 through 6 and the third form shown in FIGS. 9 through 13. As shown in FIGS. 14 through 18, a slightly different form of metal tubular case is generally indicated at 354 having a closed end 355 and an open end 356, but again extending generally longitudinally, being generally rectangular in lateral cross-section and having an upper laterally extending top wall 357.

The insulating block assembly, generally indicated at 358, is received longitudinally positioned within the case open end 356 and again includes a main generally U-shaped upwardly opening first block 359 having the laterally spaced upstanding leg portions 360 and 361 laterally separated by the lower connecting portion 362. A generally rectangular cross-section second block 363 is formed having greater longitudinal length than the U-shaped block 359 and this second block is formed with the opposed laterally extending generally U-shaped cutouts 364. This thereby forms the second block with the central block portion 365 having lateral dimensions slightly less than the lateral distance between the U-shaped first block leg portions 360 and 361, the laterally extending flanges 366 on the inner end 367 thereof, and the laterally extending flanges 368 on the outer end 369 thereof.

Both the first and second blocks 359 and 363 are again formed of usual electrically insulating material, rigid in finished form, such as porcelain. Further, the exact configuration of the second block 363 may be clearly seen in FIG. 18 removed from the insulating block assembly 358.

The first and second contact arms 370 and 371 are formed similar to those described before with the exception that they also are provided with opposed laterally extending generally U-shaped cutouts 372 and 373, respectively, of substantially identical dimensions to the cutouts 364 in the second block 363 and at the location of the insulating block assembly 358. In this respect, the first and second contact arms 370 and 371 are substantially identical with the configuration of the first contact arm, best seen in FIG. 15, illustrating the configuration of both.

Thus, in assembly of this fourth form of the thermostat switch construction of the present invention, the first contact arm 370 is received downwardly within the U-shaped first block 359 against the first block connecting portion 362 with the first block leg portions 360 and 361 extending partially laterally into the first contact arm cutouts 372, so that this U-shaped first block not only laterally confines the part of the first contact arm 370 extending longitudinally therethrough, but also restricts both inward and outward longitudinal movement of this first contact arm relative to the first block.

Next, the second block 363 is received totally downwardly into the first block 359 against the part of the first contact arm 370 with the first block leg portions 360 and 361 partially laterally received into the second block cutouts 364, so that the second block central portion 365 is closely laterally between the first block leg portions 360 and 361, the flanges 366 on the second block inner end 367 are longitudinally adjacent the inner end 374 of the U-shaped first block 359, and the flanges 368 on the second block outer end 369 are longitudinally adjacent the outer end 375 of the U-shaped first block 359. Finally, the second contact arm 371 is received at least substantially totally downwardly into the U-shaped first block 359 similar to the first contact arm 370 but overlying the second block 363.

Thereafter, it is only necessary to insert the assembled first and second blocks 359 and 363 and first and second contact arms 370 and 371 longitudinally into the open end 356 of case 354 and form the downward depression 376 in the case top wall 357 downwardly against the part of the second contact arm 371 and laterally between the leg portions 360 and 361 of the U-shaped first block 359. This thereby clamps the second block 363 and first and second contact arms 370 and 371 substantially totally downwardly within the U-shaped first block 359 laterally confined by the first block leg portions 360 and 361, as well as clamps the U-shaped first block 359 within the open end 356 of the case 354. At the same time, in this particular fourth form, due to the particular configurations of the second block 363 and first and second contact arms 370 and 371, both inward and outward longitudinal movement of these parts is restricted relative to the U-shaped first block 359 both prior to and after such clamping.

In this fourth form, the first contact arm 370 may be provided with the usual bi-metal means 377 for controlling movement of the first and second contact arms 370 and 371 toward and away from each other under varying temperature conditions. Furthermore, in this fourth form, the second contact arm 371 is not insulated from the metal case 354 but, due to the fact that the first contact arm 370 is fully insulated from this metal case by its positioning within the insulating block assembly 358, the device will still be perfectly operable.

Thus, in this fourth form of the thermostat switch construction of the present invention, as well as in the first and third forms previously described and shown in FIGS. 1 through 6 and FIGS. 9 through 13, respectively, the first and second contact arms and the second or second and third blocks are clamped substantially totally downwardly within the first block leg portions laterally confined by these leg portions, and the entire assembly of the contact arms and insulating blocks is clamped in the case end. Also, due to certain particular configurations of the contact arms and insulating blocks, these contact arms and insulating blocks are in certain cases confined against particular forms of longitudinal movement relative to each other and relative to the case.

It is pointed out that in describing certain forms of the thermostat switch construction of the present invention, the top or uppermost member, whether it is in an insulating block or a contact arm, positioned downwardly within the leg portions of the main U-shaped insulating block, has been described as being downwardly clamped "substantially totally" within this main U-shaped insulating block. By the use of this term "substantially totally" it is meant that this particular upper member may extend upwardly a slight distance above the leg portions of the main U-shaped insulating block for convenience in downward deformation and clamping by the metal case. It is important, however, that this top member be positioned for the main part downwardly within the leg portions of the main U-shaped insulating block and particularly that it be securely laterally confined by these leg portions.

In all forms of the thermostat switch construction of the present invention illustrated, therefore, rigid blocks are provided properly positioning the two contact arms within the tubular metal case, and the insulating blocks not only laterally confine the contact arms, but also grip these contact arms against the longitudinal movement after assembly. Furthermore, in each case, the insulating block assembly and contact arms may be pre-assembled remote from the case and then inserted as a unit into proper position within the case, with the final assembly operation merely being a simple clamping of the case against the contact arm and insulating block assembly.

In this manner, not only is the assembly quick and simple, but also the final switch construction is of long useful life. The rigid insulating block assembly will maintain the contact arms properly positioned and properly insulated during a long period of use.

As is usual in the thermostat switch construction, the thermostat switch constructions of the present invention may be formed to make an electrical circuit through the contacts thereof either from a temperature rise or decline, depending on the composition of the bi-metal contact arm or arms therein. Further, either form of construction is fully contemplated within the principles of the present invention.

In the foregoing description, certain terms have been used for brevity, clearness and understanding but no unnecessary limitations are to be implied therefrom, because such words are used for descriptive purposes herein and are intended to be broadly construed.

Moreover, the embodiments of the improved construction illustrated and described herein are by way of example and the scope of the present invention is not limited to the exact details of construction shown.

Having now described the invention, the construction, operation and use of preferred embodiments thereof, and the advantageous new and useful results obtained thereby, the new and useful construction and reasonable mechanical equivalents thereof obvious to those skilled in the art are set forth in the appended claims.

I claim:

1. Thermostat switch construction including a tubular deformable metal case having at least one open end and an upper case wall, a rigid generally U-shaped cross-section first insulation block at and within the case open end with the U-opening thereof opening upwardly against the upper case wall, the rigidity of the first insulation block providing said block substantially non-deformable, first contact strip means having a rearward end portion extending through the U-opening of the first insulation block overlying said first block, the first contact strip means having a forward end portion extending into the case from said first block in cantilever fashion and having electrical contact means on said forward end portion spaced inwardly from the first insulation block and arranged for electrical contact upwardly, a rigid second insulation block within the U-opening of the first insulation block overlying the rearward end portion of the first contact strip means, the rigidity of the second insulation block providing said block substantially non-deformable, second contact strip means having a rearward end portion extending through the U-opening of the first insulation block overlying the second insulation block, the second contact strip means having a forward end portion extending into the case overlying the first contact strip means and having electrical contact means on said forward end portion aligned for electrical contact downwardly against the electrical contact means of the first contact strip means, at least one of the first and second contact strip means being bimetallic strip means for movement toward and away from the other of said strip means subject to temperature variations and for electrical contact between the respective electrical contact means, and deformed portion means on the case for clamping the case upper wall downwardly at least against the assembled second insulation block and first and second contact strip means to secure said second block and said contact strip means assembled within the U-opening of the first insulation block and to secure said first block within the case open end.

2. Thermostat switch construction as defined in claim 1 in which a rigid third insulation block is within the U-opening of the first insulation block overlying the rearward end portion of the second contact strip means; in which the rigidity of the third insulation block provides said block substantially non-deformable; and in which the deformed portion means on the case clamps the case upper wall downwardly at least against the third insulation block and thereby clamps the assembled second and third insulation blocks and first and second contact strip means to secure said blocks and said contact strip means assembled within the U-opening of the first insulation block and to secure said first block within the case open end.

3. Thermostat switch construction as defined in claim 1 in which a rigid third insulation block is within the U-opening of the first insulation block overlying the rearward end portion of the second contact strip means; in which the rigidity of the third insulation block provides said block substantially non-deformable; in which the deformed portion means on the case clamps the case upper wall downwardly at least against the third insulation block and thereby clamps the assembled second and third insulation blocks and first and second contact strip means to secure said blocks and said contact strip means assembled within the U-opening of the first insulation block and to secure said first block within the case open end; in which the case has an end surface at said case open end; in which the generally U-shaped first insulation block and the second and third insulation blocks each have rearward ends generally adjacent the case end; in which the first insulation block rearward end has flange means engaged with the case end surface for limiting movement of said first block into the case open end during assembly; and in which the second and third insulation block rearward ends have flange means engaged with the first insulation block rearward end for limiting movement of said second and third blocks into the first block U-opening during assembly.

4. Thermostat switch construction as defined in claim 1 in which the rearward end portions of the first and second contact strip means and the second insulation block all have generally U-shaped cutout means formed therein aligned with the generally U-shaped first insulation block and receiving portions of said first block therein for locating said contact strip means and second block in preset positions relative to said first block.

References Cited by the Examiner
UNITED STATES PATENTS

| | | | |
|---|---|---|---|
| 2,261,366 | 11/1941 | Grout | 200—138 |
| 2,474,190 | 6/1949 | Porter | 200—113 |
| 2,530,059 | 11/1950 | Hood | 200—166 |
| 2,575,806 | 11/1951 | Graybill et al. | 200—166 |
| 2,591,684 | 4/1952 | Deakin | 200—166 |
| 2,792,474 | 5/1957 | Dales | 200—138 |
| 2,832,869 | 4/1958 | Lenoir | 200—138 |
| 2,896,062 | 7/1959 | Kueser | 200—138 |
| 2,944,324 | 7/1960 | Moyer | 200—138 |
| 2,986,621 | 5/1961 | Midgley | 200—166 X |
| 3,031,551 | 4/1962 | White et al. | 200—138 X |
| 3,061,699 | 10/1962 | Epstein | 200—138 X |
| 3,108,167 | 10/1963 | Prouty et al. | 200—122 |
| 3,148,258 | 9/1964 | Dales | 200—138 |

BERNARD A. GILHEANY, *Primary Examiner.*

LAURENCE A. WRIGHT, *Assistant Examiner.*